March 20, 1934.                V. C. SMITH                1,951,741
                         VEHICULAR TANK SUPPORT
                           Filed Aug. 4, 1930

Victor C. Smith Inventor

W. E. Currie Attorney

UNITED STATES PATENT OFFICE 1,951,741

VEHICULAR TANK SUPPORT

Victor C. Smith, Norwalk, Conn., assignor to Standard Oil Development Company

Application August 4, 1930, Serial No. 472,785

3 Claims. (Cl. 280—5)

This invention relates to improvements in tank vehicles and has for an object to provide an improved mounting for supporting a tank upon a vehicle. The invention will be fully understood from the following description taken in connection with the accompanying drawing, in which Fig. 1 is a side elevation of a tank vehicle constructed in accordance with the invention;

Figure 1:
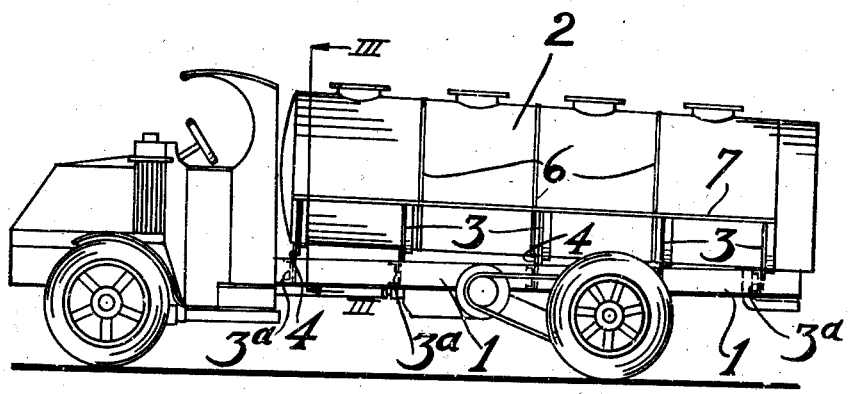
Figure 2:
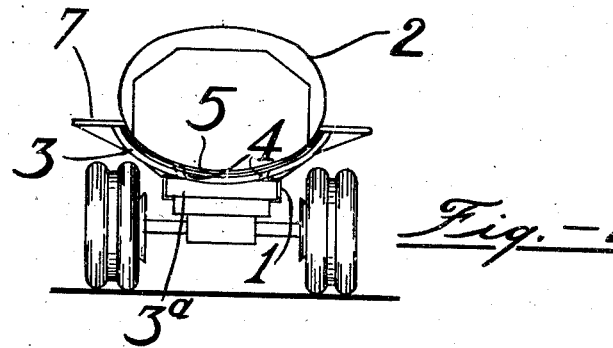
Fig. 2 is an end elevation showing the rear end of the vehicle.
Figure 3:
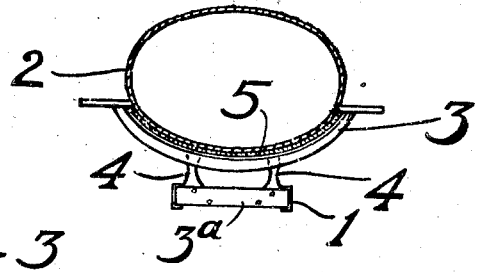
Fig. 3 is a section taken on line III—III of Fig. 1.

In the drawing, reference numeral 1 designates a vehicle chassis, or frame formed of channeled side members, and 2 designates a tank, or container. In the embodiment shown, the tank is of substantially oval shape in cross section.

The tank is carried upon the frame by means of a plurality of supports 3 which extend transversely of the frame at spaced intervals. Each support is provided with an upper supporting surface having, in general, the arcuate shape of the under surface of the tank. Each support comprises a cross-member or supporting frame work 3a, the ends of which rest within the channels of the side members 1. Each cross member may be an angle bar, rod, pipe or other structural shape. Each cross-member 3a is provided with legs 4 which are secured rigidly to the cross-member and to the support 3. The length of the legs of each cross-member is increased progressively from the right to left of the vehicular frame, as viewed in Fig. 1, whereby the supporting surfaces of the members are disposed at progressively increasing distances from the frame. The tank therefore is inclined downwardly longitudinally from front to rear of the vehicle. Each cross-member carries a rubbing strip 5 of closely woven non-absorbent fabric, such as brake lining, copper or asbestos fabric, or the like. The tank 2 is disposed upon the rubbing strips and is secured in position by means of a plurality of straps 6 of steel, or other suitable material, which extend around the tank and are secured to the cross-members. The cross-members carry a running-board 7 at each side of the tank.

The tank is supported upon a vehicle frame by a mounting which is of minimum weight and which permits of carrying the tank in closely spaced relation to the frame whereby the center of gravity of the tank is lowered. The mounting is constructed entirely of non-inflammable material and with a minimum of parts.

Various changes and alternative arrangements may be made within the scope of the claims, in which it is the intention to claim all novelty inherent in the invention as broadly as the prior art permits.

I claim:

1. In a tank vehicle, a chassis frame, a plurality of supports in the form of angle bars extending transversely across the frame rigidly secured to the frame and disposed in spaced relation longitudinally of the frame, each angle bar having legs spaced longitudinally of each angle bar and extending upwardly above the angle bar, a supporting member having an arcuate shape carried by the legs and sustaining the tank, the length of the legs increasing progressively from the rear to the front of the vehicle whereby the tank is mounted in an inclined position.

2. Apparatus according to claim 1, in which the supporting structure is made throughout of non-inflammable material, and a friction strip is arranged between the arcuate member and the tank.

3. In a tank vehicle, a chassis frame having channeled side members, the channels of which face each other, a plurality of supports spaced longitudinally of the frame, each support comprising a cross member extending transversely between the side members and its ends fitting into the channels of the side members, each cross member having upwardly extending projections constituting legs spaced longitudinally of each cross member, and a supporting member having an arcuate shape secured only to the spaced legs.

VICTOR C. SMITH.